(12) United States Patent
Labitzke et al.

(10) Patent No.: US 7,301,309 B2
(45) Date of Patent: Nov. 27, 2007

(54) METHOD AND DEVICE FOR PROVIDING THE SUPPLY VOLTAGE FOR THE LOADS OF A VEHICLE ON-BOARD ELECTRICAL SYSTEM, USING A PLURALITY OF GENERATORS

(75) Inventors: Herbert Labitzke, Markgroeningen (DE); Helmut Suelzle, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 11/372,858

(22) Filed: Mar. 10, 2006

(65) Prior Publication Data

US 2006/0208709 A1    Sep. 21, 2006

(30) Foreign Application Priority Data

Mar. 17, 2005   (DE) .................. 10 2005 012 270

(51) Int. Cl.
    *H02P 9/10*    (2006.01)
(52) U.S. Cl. .................. 322/22; 322/24; 322/28; 307/19
(58) Field of Classification Search ............ 322/22, 322/23, 24, 25, 27, 28, 36; 307/6, 19, 87
    See application file for complete search history.

(56) References Cited

U.S. PATENT DOCUMENTS

| | | | | |
|---|---|---|---|---|
| 4,239,978 A | * | 12/1980 | Kofink | 307/16 |
| 4,336,485 A | * | 6/1982 | Stroud | 320/126 |
| 4,347,473 A | * | 8/1982 | Stroud | 320/126 |
| 4,658,200 A | | 4/1987 | Kouge | |
| 4,730,097 A | * | 3/1988 | Campbell et al. | 219/203 |
| 5,254,936 A | | 10/1993 | Leaf et al. | |
| 5,663,632 A | * | 9/1997 | Roseman et al. | 322/59 |
| 5,723,972 A | | 3/1998 | Bartol et al. | |
| 7,064,524 B2 | * | 6/2006 | Yao | 322/25 |

FOREIGN PATENT DOCUMENTS

| | | |
|---|---|---|
| DE | 41 08 861 | 10/1992 |
| DE | 102004051742 | 4/2006 |
| EP | 1511151 | 3/2005 |

* cited by examiner

*Primary Examiner*—Nicholas Ponomarenko
(74) *Attorney, Agent, or Firm*—Kenyon & Kenyon LLP

(57) ABSTRACT

A method and a device for providing the supply voltage for the loads of a vehicle on-board electrical system, using a plurality of generators. A regulator unit having at least one output stage transistor is allocated to each of the generators. The output stage transistor is controlled by means of a pulse-width-modulated control signal. The control signal generated in one of the regulator units, or a control signal derived therefrom that describes the pulse-duty factor of the pulse-width-modulated signal, is also supplied to the regulator units of the additional generators, and is also used there to control the output stage transistors. This procedure may bring into agreement the degree of loading of the generators.

7 Claims, 1 Drawing Sheet

METHOD AND DEVICE FOR PROVIDING THE SUPPLY VOLTAGE FOR THE LOADS OF A VEHICLE ON-BOARD ELECTRICAL SYSTEM, USING A PLURALITY OF GENERATORS

FIELD OF THE INVENTION

The present invention relates to a method and a device for providing the supply voltage for the loads of a vehicle on-board electrical system, using a plurality of generators.

BACKGROUND INFORMATION

Conventionally, power is supplied to the on-board electrical system of a motor vehicle using a generator.

In addition, at least two generators are used to supply energy to the electrical system of certain vehicles, for example security vehicles, emergency vehicles, and utility vehicles, in order to ensure that the required power and/or reliability of the electrical supply can be provided.

The wear, and thus also the life span, of a generator depends on several factors. One of these factors is its electrical loading. The higher the electrical load of a generator is, the greater is its wear, and the lower its remaining life span. It is therefore desirable, in devices for providing the supply voltage for the loads of a vehicle electrical system using a plurality of generators, to make sure that the degree of loading of the generators used is equal.

German Patent No. DE 41 08 861 describes a device having generators connected in parallel. In this conventional device, a voltage regulator is allocated to each of the generators. In addition, this device has at least one battery of which one terminal can be connected to the voltage regulator via an ignition switch. In addition, a charge control device is provided that is connected to the ignition switch and to the voltage regulators, and that can be connected via a switching device to the negative terminal of the battery, which is preferably at ground. Between the charge control device, the voltage regulators, and the named switching device, there is a circuit system having a plurality of components that are conductive in one direction and are blocking in one direction. This device is intended to achieve the effect that through the use of two generators a high degree of electrical power can be produced, and that errors that may occur in one of the two generator-voltage regulator systems can be indicated using a single indicator device, for example a charge control lamp, it being possible for the other generator-voltage regulator system to continue to operate without problems.

SUMMARY

A method and a device according to the present invention may have the advantage that the degree of loading of the generators in the device is equal. The example procedure compensates, among other things, manufacturing- and equalization-related scatterings of the regulator/generator units of the device.

According to the present invention, these advantages are achieved in that a pulse-width-modulated control signal generated in the regulator, or a control signal derived therefrom that describes the pulse-duty factor of the pulse-width-modulated signal, is used not only to control the output transistor of the regulator, but also supplied to the additional regulators, and is also used to control the joutput stage transistors of these additional regulators.

Advantageously, each of the additional regulators monitors the control signal supplied to its respective output stage transistor. If the presence of an error is recognized, the named additional regulators then switch over to an autonomous regulating mode. In this autonomous regulating mode, a control signal generated in one of the additional regulators itself is forwarded to the respective associated output stage transistor.

In an advantageous refinement of the present invention, the additional regulators for recognizing an error situation also monitor their own voltage input. This further increases the reliability of the voltage supply to the loads of the electrical system.

Additional advantageous characteristics of the present invention result from the explanation relating to an example shown in the figure.

DETAILED DESCRIPTION OF EXAMPLE EMBODIMENTS

Figure 1:
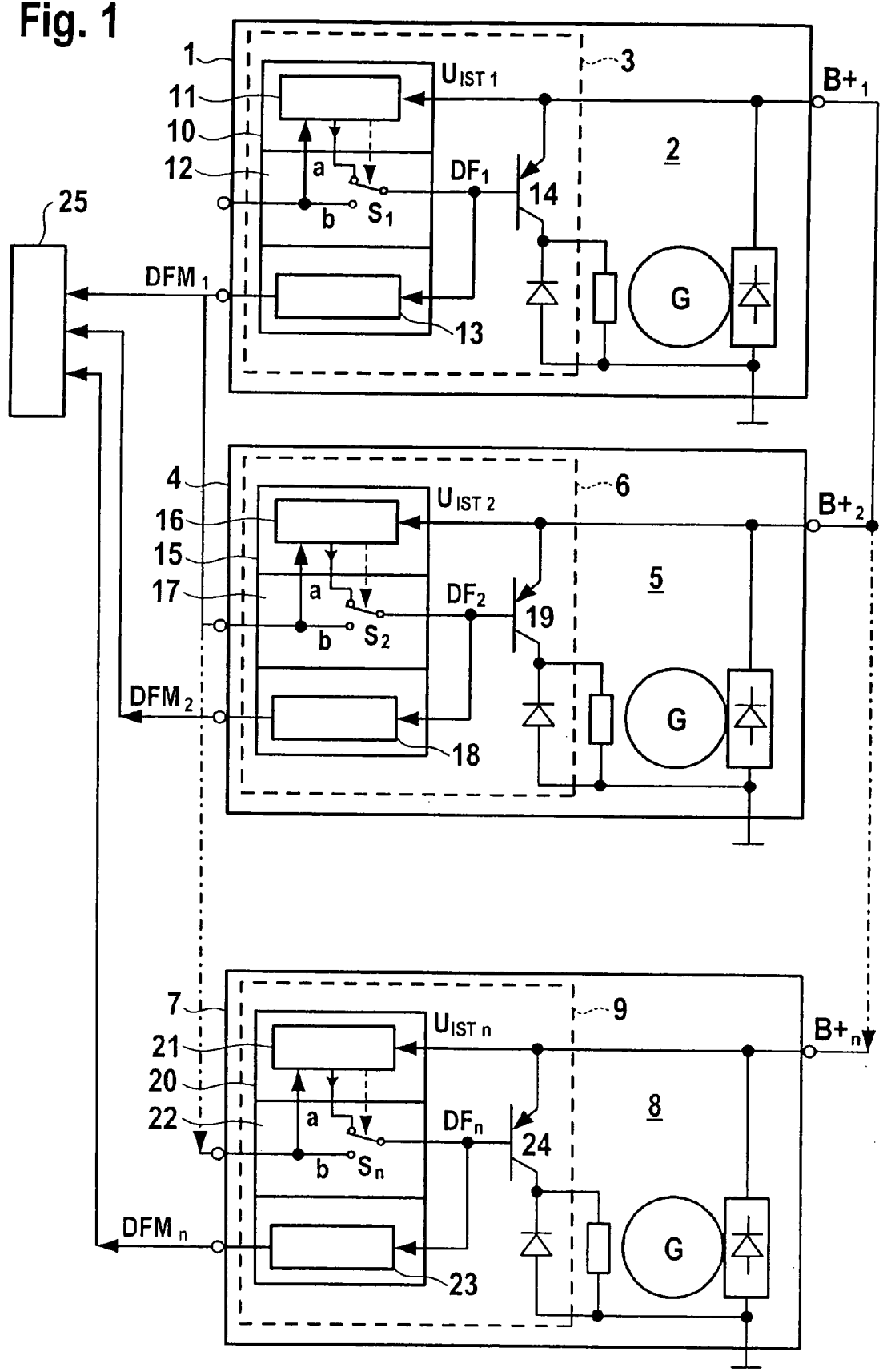
FIG. 1 shows an exemplary embodiment of a device for providing the supply voltage for the loads of a vehicle electrical system using a plurality of generators.

The example device shown in FIG. 1 has n generator units connected in parallel to one another, designated 1, 4, and 7 in FIG. 1. The voltage values provided at the voltage outputs of generator units 1, 4, and 7 are designated $B+_1$, $B+_2$, and $B+_n$. These voltage values can differ from one another due to manufacturing- and equalization-related scattering of the generators and regulator units, as well as due to differing line resistances.

Generator unit 1 has a first generator 2 and a first regulator unit 3. First regulator unit 3 includes a regulator IC 10, an output stage transistor 14 connected to this IC, and a freewheeling diode connected to the collector of output stage transistor 14. Regulator IC 10 contains a regulator control logic system 11, a switching unit 12, and a feedback logic system 13. Regulator logic system 11 has an input for a control signal adjacent to terminal b of a switch $S_1$ of switching unit 12, and an input for a voltage actual value $U_{actual1}$. At the output side, regulator logic system 11 provides a switch control signal for switch $S_1$, as well as a control signal that is supplied to terminal a of switch $S_1$. Control signal $DF_1$, generated at the output of switch $S_1$, is a pulse-width-modulated control signal that is supplied to the base of output stage transistor 14 of first regulator unit 3. In addition, control signal $DF_1$ is fed back to feedback logic system 13 of regulator IC 10. According to a specific embodiment of the present invention, this feedback logic system contains only a decoupling stage. The signal provided at the output of feedback logic system 13 is forwarded, as monitor signal $DFM_1$, to a control device 25, and is evaluated there, for example in the sense of an acquisition of the degree of loading of first generator 2.

In FIG. 1, generator 2 of first generator unit 1 is illustrated by a rotor situated parallel to the freewheeling diode of regulator unit 3, a block G, and a rectifier unit. At the output of the rectifier unit, the supply direct voltage generated by generator 2 is provided. This voltage is provided at voltage output $B+_1$ of first generator unit 1, and is additionally adjacent to the emitter of output stage transistor 14 and, as voltage actual value $U_{actual1}$, to the voltage input of regulator logic system 11.

Generator unit 4 has a second generator 5 and a second regulator unit 6. Second regulator unit 6 has a regulator IC 15, an output stage transistor 19 connected to this IC, and a freewheeling diode connected to the collector of output stage transistor 19. Regulator IC 15 contains a regulator logic system 16, a switching unit 17, and a feedback logic system 18. Regulator logic system 16 has an input for a control signal adjacent to terminal b of a switch $S_2$ of switching unit 17, as well as an input for a voltage actual value $U_{actual2}$. At the output side, regulator logic system 16 provides a switch control signal for switch $s_2$, as well as a control signal that is supplied to terminal a of switch $S_2$. Control signal $DF_2$, generated at the output of switch $S_2$, is a pulse-width-modulated control signal that is supplied to the base of output stage transistor 19 of second regulator unit 6. In addition, control signal $DF_2$ is fed back to feedback logic system 18 of regulator IC 15. According to a specific embodiment of the present invention, this feedback logic system contains only one decoupling stage. The signal provided at the output of feedback logic system 18 is forwarded as monitor signal $DFM_2$ to control device 25, and is evaluated there, for example in the sense of an acquisition of the degree of loading of second generator 5.

Generator 5 of second generator unit 4 is illustrated in FIG. 1 by a rotor situated parallel to the freewheeling diode of regulator unit 6, a block G, and a rectifier unit. At the output of the rectifier unit, the supply direct voltage generated by generator 5 is provided. This voltage is provided at voltage output $B+_2$ of second generator unit 4, and is in addition adjacent to the emitter of output stage transistor 19 and, as voltage actual value $U_{actual2}$, to the voltage input of regulator logic system 16.

Generator unit 7 has an nth generator 8 and an nth regulator unit 9. Nth regulator unit 9 includes a regulator IC 20, an output stage transistor 24 connected to this IC, and a freewheeling diode connected to the collector of output stage transistor 24. Regulator IC 20 contains a regulator logic system 21, a switching unit 22, and a feedback logic system 23. Regulator logic system 21 has an input for a control signal adjacent to terminal b of a switch $S_n$ of switching unit 22, as well as an input for a voltage actual value $U_{actualn}$. At the output side, regulator logic system 21 provides a switch control signal for switch $S_n$, as well as a control signal that is supplied to terminal a of switch $S_n$. Control signal $DF_n$, generated at the output of switch $S_n$, is a pulse-width-modulated control signal that is supplied to the base of output stage transistor 24 of nth regulator unit 9. In addition, control signal $DF_n$ is fed back to feedback logic system 23 of regulator IC 20. According to a specific embodiment of the present invention, this feedback logic system contains only one decoupling stage. The signal provided at the output of feedback logic system 23 is forwarded, as monitor signal $DFM_n$, to control device 25, and is evaluated there, for example in the sense of an acquisition of the degree of loading of nth generator 8.

Generator 8 of nth generator unit 7 is illustrated in FIG. 1 by a rotor situated parallel to the freewheeling diode of regulator unit 9, a block G, and a rectifier unit. At the output of the rectifier unit, the supply direct voltage generated by generator 8 is provided. This voltage is provided at voltage output $B+_n$ of nth generator unit 8, and is in addition adjacent to the emitter of output stage transistor 24 and, as voltage actual value $U_{actualn}$, to the voltage input of regulator logic system 21.

In addition, according to the present invention the pulse-width-modulated control signal generated in first regulator unit 3, or a control signal derived therefrom that describes the pulse-duty factor of this pulse-width-modulated control signal, is supplied to regulator unit 6 and 9 of generator units 4 and 7, and is also used there to control output stage transistors 19 and 24 of regulator units 6 and 9.

In the exemplary embodiment shown in FIG. 1, signal $DFM_1$, present at the output of feedback logic system 13 of regulator IC 10, is supplied to regulator unit 6 of generator unit 4, and to regulator unit 9 of generator unit 7.

In regulator unit 6, signal $DFM_1$ reaches terminal b of switch $S_2$ of switching unit 17. In normal operation, switch $S_2$ is conducting for the signal adjacent to terminal b, so that signal $DFM_1$ is forwarded via switch $S_2$, as pulse-width-modulated control signal $DF_2$, to output stage transistor 19 of second regulator unit 6.

Pulse-width-modulated control signal $DF_2$ of output stage transistor 19 is also adjacent to feedback logic system 18 of regulator IC 15. This feedback logic system 18 has only one decoupling stage. The signal present at the output of feedback logic system 18 is forwarded, as monitor signal $DFM_2$, to control device 25, in which the degree of loading of second generator 5 is determined on the basis of this monitor signal.

In addition, regulator logic system 16 monitors the control signal derived from terminal b of switch $S_2$, and preferably also monitors the voltage actual value $U_{actual2}$ supplied to it. If these values lie outside predetermined limits, the presence of an error is recognized. In the case of such an error, regulator logic system 16 generates a switch control signal for switch $S_2$ that switches switch $S_2$ into its switching position a.

In this switching position a of switch $S_2$, signal $DFM_1$, derived from regulator unit 3, is no longer forwarded to output stage transistor 19; rather, a control signal generated by regulator logic system 16 itself is so forwarded. This control signal is determined by regulator logic system 16 through a comparison of fed-back voltage actual value $U_{actual2}$ with a predetermined target value for the output voltage of generator 5. Consequently, if an error is present a changeover takes place to an autonomous regulation of generator 5, with the aid of regulator unit 6.

In regulator unit 9 of nth generator unit 7, signal $DFM_1$ reaches terminal b of switch $S_n$ of switching unit 22. In normal operation, switch $S_n$ is conducting for the signal adjacent to terminal b, so that the signal $DFM_1$ is forwarded via switch $S_n$, as pulse-width-modulated control signal $DF_n$, to output stage transistor 24 of nth regulator unit 9.

Pulse-width-modulated control signal $DF_n$ of output stage transistor 24 is also adjacent to feedback logic system 23 of regulator IC 20. This feedback logic system 23 has only one decoupling stage. The signal adjacent to the output of feedback logic system 23 is forwarded, as monitor signal $DFM_n$, to control device 25, in which the degree of loading of nth generator 8 is determined on the basis of this monitor signal.

In addition, regulator logic system 21 monitors the control signal derived from terminal b of switch $S_n$, and preferably also monitors voltage actual value $U_{actualn}$ supplied to the regulator logic system. If these values lie outside predetermined limits, the presence of an error is recognized.

In the case of such an error, regulator logic system 21 generates a switch control signal for switch $S_n$ that changes switch $S_n$ over to its switching position a.

In this switching position a of switch $S_n$, signal $DFM_1$, derived from regulator unit 3, is no longer forwarded to output stage transistor 24; rather, a control signal generated by regulator logic system 21 itself is so forwarded. This control signal is determined by regulator logic system 21 through a comparison of fed-back voltage actual value $U_{actualn}$ with a predetermined target value for the output voltage of generator 8. Consequently, if an error is present a changeover takes place to an autonomous regulation of generator 8, with the aid of regulator unit 9.

According to the present invention, after all of the above, in error-free normal operation the pulse-width-modulated control signal for the output stage transistor, generated in one of the regulator units, or a control signal derived therefrom that describes the pulse-duty factor of the pulse-width-modulated signal, is also supplied to the regulator units of the additional generators, and is also used there to control the respective output stage transistor. This has the advantage that the degree of loading of the generators provided parallel to one another is brought into agreement. In this procedure, manufacture- and equalization-related scatterings of the generator units used are compensated. Overall, this results in a lengthening of the life span of the generators, and thus of the overall device for providing the supply voltage for the loads of a vehicle on-board electrical system.

According to an advantageous refinement of the present invention, the control signal that is derived from the pulse-width-modulated control signal for the output stage transistor, and that describes the pulse-duty factor of the pulse-width-modulated control signal and is used to control the output stage transistors of the additional regulator units or generators, can be an inverted signal, a time-shifted signal, or a filtered, for example low-pass filtered, signal.

In addition, according to the exemplary embodiment shown in FIG. 1 each of the regulator units has one output stage transistor. However, the present invention is equally applicable in cases in which one or more of the regulator units that are provided is equipped with more than one output stage transistor.

LIST OF REFERENCE CHARACTERS

1 first generator unit
2 first generator
3 first regulator unit
4 second generator unit
5 second generator
6 second regulator unit
7 nth generator unit
8 nth generator
9 nth regulator unit
10 regulator IC of the first regulator unit
11 regulator logic system of the first regulator unit
12 switching unit of the first regulator unit
13 feedback logic system of the first regulator unit
14 output stage transistor of the first regular unit
15 regulator IC of the second regulator unit
16 regulator logic system of the second regulator unit
17 switching unit of the second regulator unit
18 feedback logic system of the second regulator unit
19 output stage transistor of the second regulator unit
20 regulator IC of the nth regulator unit
21 regulator logic system of the nth regulator unit
22 switching unit of the nth regulator unit
23 feedback logic system of the nth regulator unit
24 output stage transistor of the nth regulator unit
25 control device
$DF_1$, $DF_2$, $DF_n$ pulse-width-modulated control signals
$DFM_1$, $DFM_2$, $DFM_n$ feedback signals
$S_1$ switch
$S_2$ switch
$S_n$ switch
$B+_1$, $B+_2$, $B+_n$ voltage outputs
$U_{actual1}$, $U_{actual2}$, $U_{actualn}$ voltage actual values

What is claimed is:

1. A device for providing a supply voltage for loads of a vehicle electrical system, comprising:
   a first generator;
   a first regulator unit allocated to the first generator and having a first output stage transistor;
   a second generator; and
   a second regulator unit allocated to the second generator and having a second output stage transistor;
   wherein each of the first and second output stage transistors is controlled by a pulse-width-modulated control signal generated in a regulator unit;
   wherein the device has a connection between the first and the second regulator unit via which the pulse-width-modulated control signal generated in the first regulator unit, or a control signal derived therefrom that describes a pulse-duty factor of the pulse-width-modulated signal, is supplied to the second regulator unit; and
   wherein, in the second regulator unit, a connection is provided via which the pulse-width-modulated control signal generated in the first regulator unit, or the control signal derived therefrom that describes the pulse-duty factor of the pulse-width-modulated signal, is capable of being forwarded to the second output stage transistor.

2. The device as recited in claim 1, wherein the control signal derived from the pulse-width-modulated control signal is an inverted or time-shifted pulse-width-modulated control signal.

3. The device as recited in claim 1, wherein the control signal derived from the pulse-width-modulated control signal is a filtered pulse-width-modulated control signal.

4. The device as recited in claim 1, wherein the second regulator unit has a switching unit via which either the control signal provided in the first regulator unit or a control signal generated in the second regulator unit is forwarded to the second output stage transistor.

5. The device as recited in claim 4, wherein the second regulator unit is configured to monitor the control signal supplied to the second stage output stage transistor, and, if an error situation is recognized, change over the switching unit in such a way that the control signal generated in the second regulator unit is forwarded to the second output stage transistor.

6. The device as recited in claim 5, wherein the second regulator unit is configured to monitor a voltage actual value signal to recognize an error situation.

7. The device as recited in claim 1, wherein the device includes n generators, such that:

$n \geq 2$.

* * * * *